(12) United States Patent
Solomon

(10) Patent No.: US 8,038,541 B1
(45) Date of Patent: Oct. 18, 2011

(54) MOTION BASED SYSTEM

(76) Inventor: Jared Freeman Solomon, Venice, CA (US)

( * ) Notice: Subject to any disclaimer, the term of this patent is extended or adjusted under 35 U.S.C. 154(b) by 965 days.

(21) Appl. No.: 10/780,924

(22) Filed: Feb. 17, 2004

(51) Int. Cl.
*A63G 1/00* (2006.01)
*A63G 31/16* (2006.01)

(52) U.S. Cl. .................. 472/1; 472/31; 472/39; 472/47; 472/59; 472/60; 472/130

(58) Field of Classification Search .............. 472/1, 31, 472/39, 47, 59, 60, 130; 434/55, 59
See application file for complete search history.

(56) References Cited

U.S. PATENT DOCUMENTS

| | | | | |
|---|---|---|---|---|
| 1,940,030 | A * | 12/1933 | Steiber | 244/63 |
| 2,629,593 | A * | 2/1953 | Bartlett | 472/40 |
| 4,003,314 | A * | 1/1977 | Pearson | 104/307 |
| 4,576,373 | A * | 3/1986 | Spieldiener et al. | 472/33 |
| 4,685,398 | A * | 8/1987 | Kissel, Jr. | 104/88.02 |
| 4,710,128 | A | 12/1987 | Wachsmuth et al. | |
| 4,751,662 | A | 6/1988 | Crosbie | |
| 4,823,626 | A | 4/1989 | Hartmann et al. | |
| 4,825,716 | A | 5/1989 | Roberts et al. | |
| 4,848,241 | A * | 7/1989 | Kunczynski | 104/173.1 |
| 5,021,982 | A | 6/1991 | Crosbie et al. | |
| 5,158,021 | A * | 10/1992 | Matsui et al. | 104/292 |
| 5,353,242 | A | 10/1994 | Crosbie et al. | |
| 6,042,382 | A | 3/2000 | Halfhill | |
| 6,149,873 | A * | 11/2000 | Potter et al. | 422/123 |
| 6,988,951 | B1 * | 1/2006 | Newman et al. | 472/39 |
| 7,172,511 | B2 * | 2/2007 | Casey | 472/47 |
| 2002/0183123 | A1 * | 12/2002 | De-Gol | 472/59 |
| 2003/0092496 | A1 | 5/2003 | Alsenz | |
| 2003/0219702 | A1 | 11/2003 | McClintic | |
| 2006/0178221 | A1 * | 8/2006 | Threlkel | 472/1 |

FOREIGN PATENT DOCUMENTS

DE 4020888 A1 2/1992
WO WO8403477 * 9/1984

* cited by examiner

*Primary Examiner* — Xuan Thai
*Assistant Examiner* — Kang Hu
(74) *Attorney, Agent, or Firm* — Greenberg Traurig

(57) ABSTRACT

A motion-based system includes one or more passenger units, gimbaled about three axes, movably attached to arms or slots in a planar system extending radially from a central hub. The passenger units may be positioned along the arms any distance from the central hub thereby providing means for varying forces to be exerted thereon while maintaining a constant rotational speed. The mobile passenger units further provide means for loading and unloading subjects during operation of the system. The means includes passenger units being moved to the central hub location where they are disengaged from the rotating system and safely loaded and unloaded. Computers control the rotational speed of the system and the movements of the passenger units about at least three axes based on inputted or real-time data. The data can simulate real events, be arbitrarily developed or be based on real time events. The motion-based system has both training and amusement purposes.

25 Claims, 14 Drawing Sheets

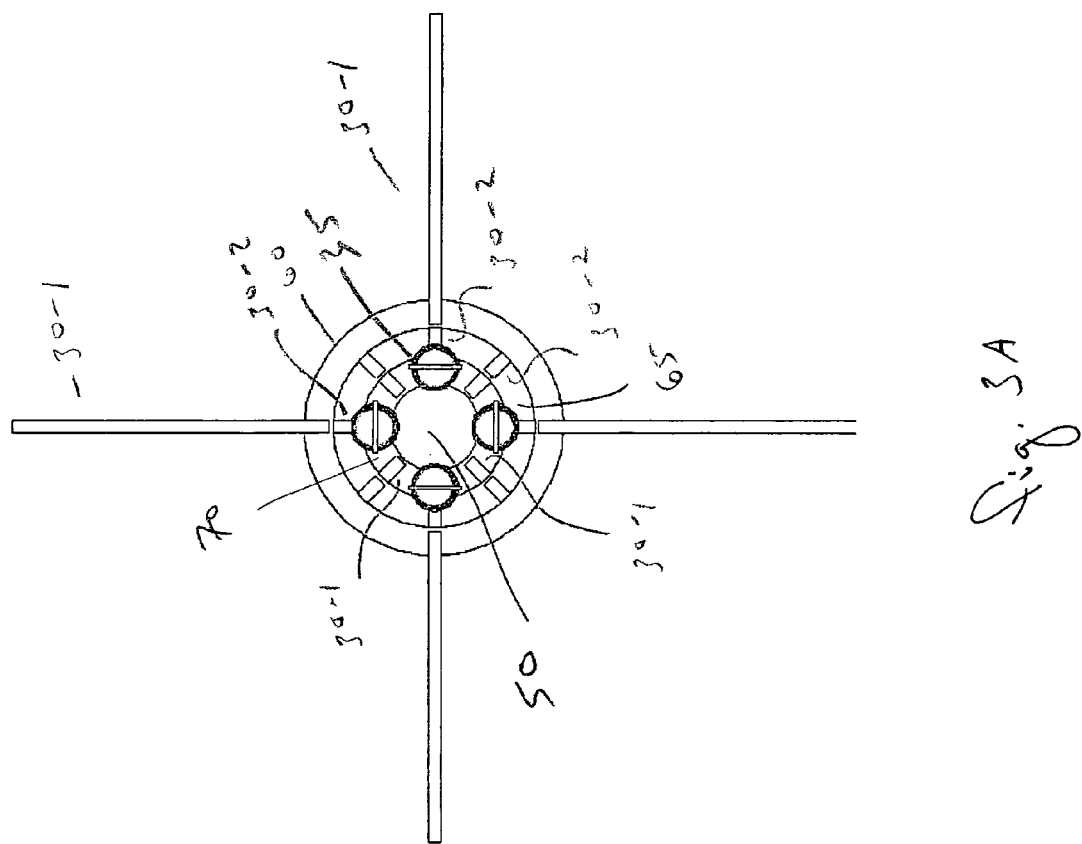

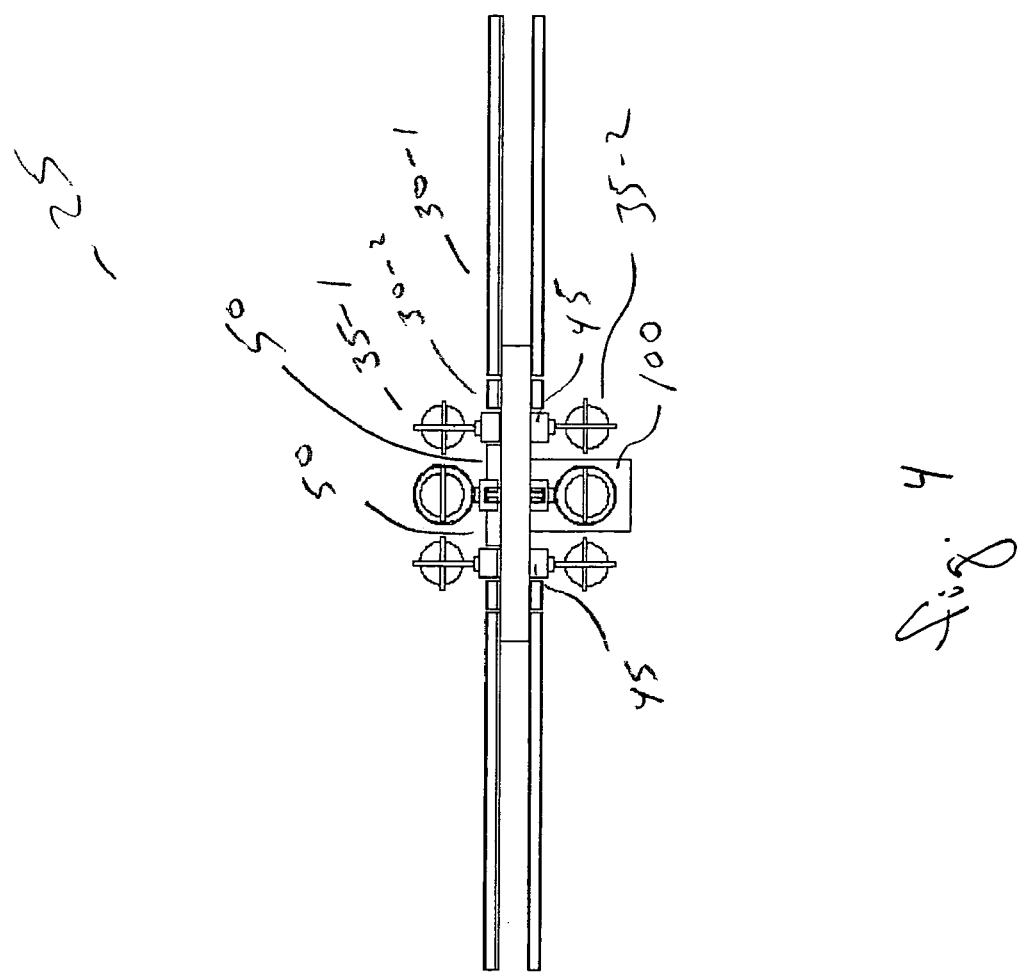

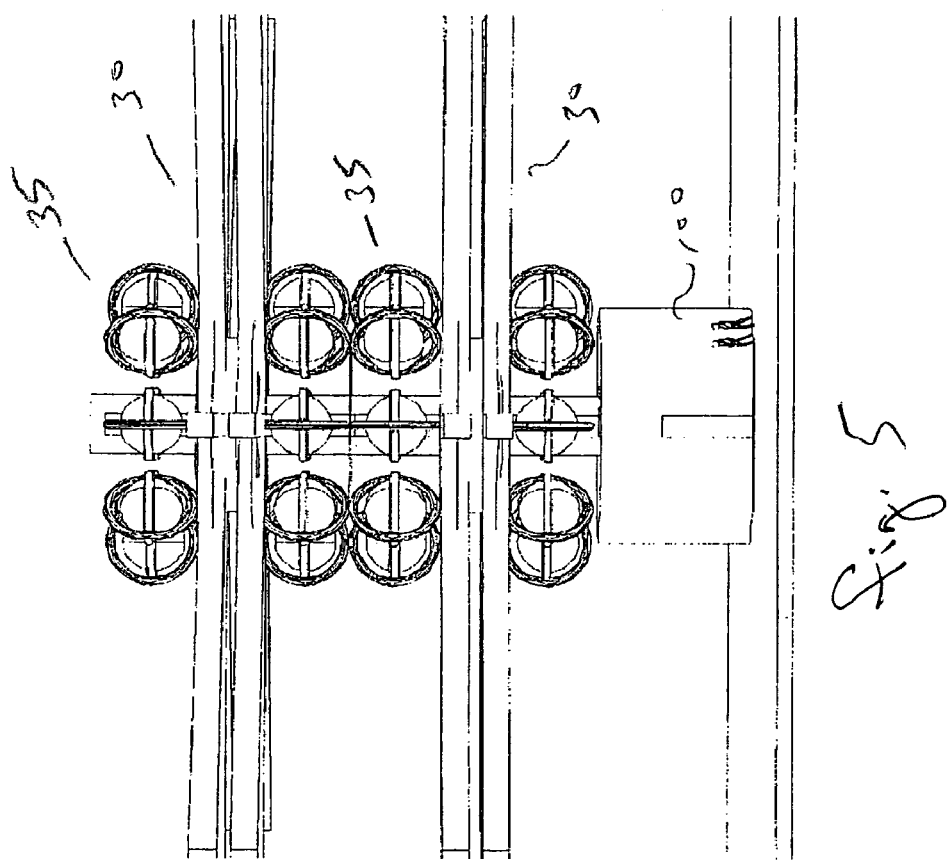

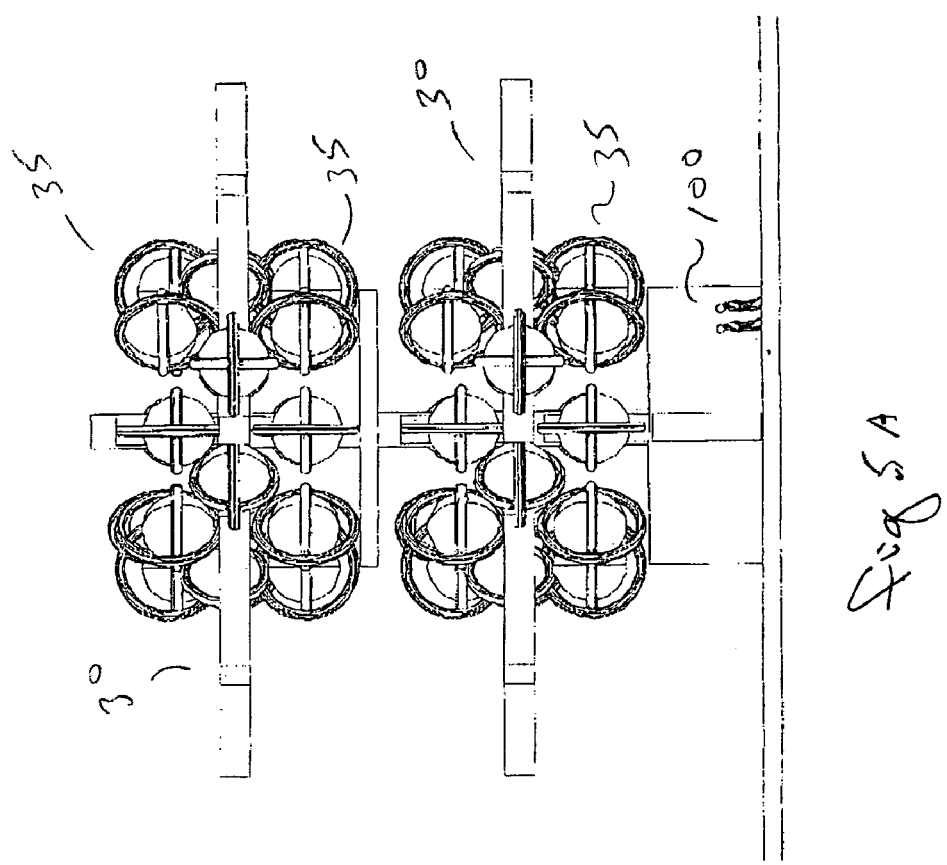

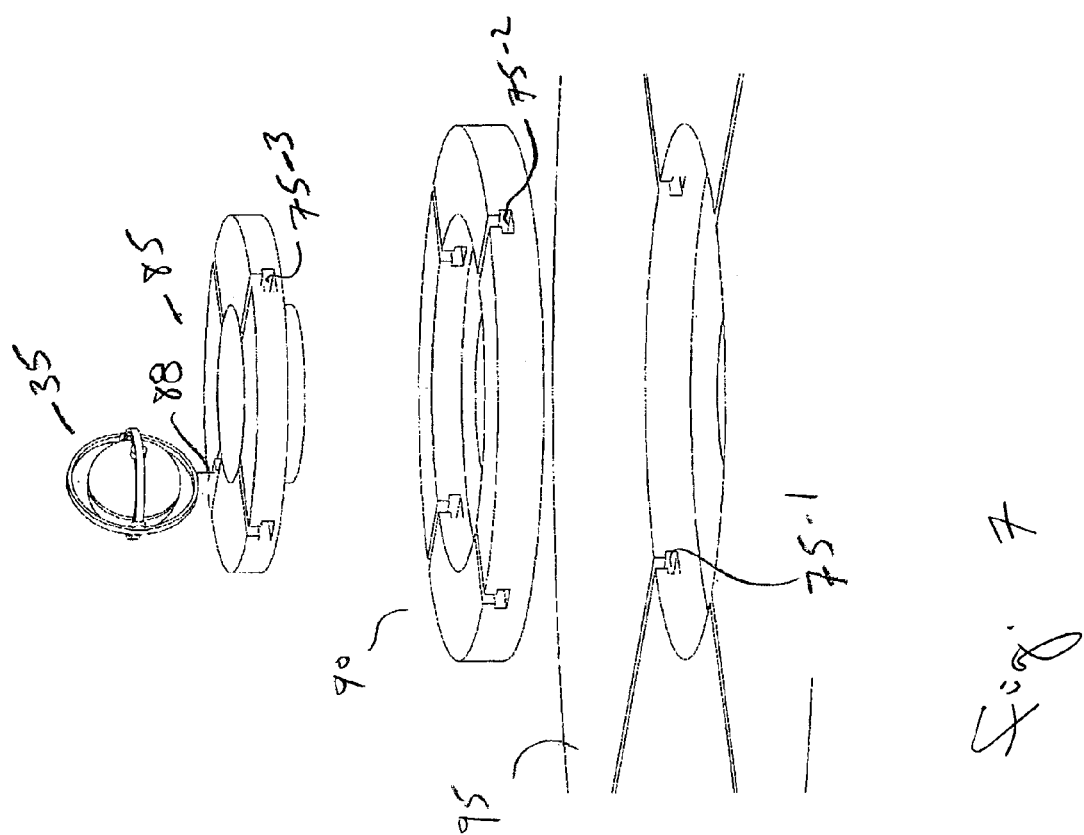

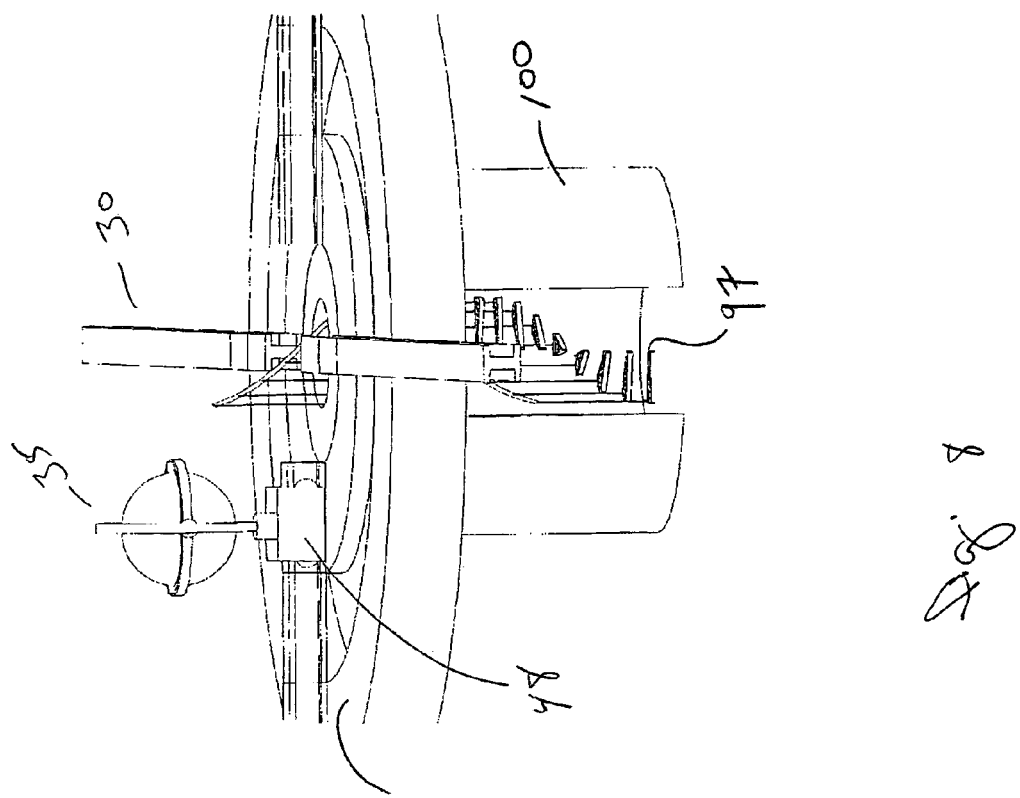

MOTION BASED SYSTEM

FIELD OF INVENTION

The present invention relates to a three-dimensional motion based system. Passenger units are gimbaled to provide three dimensions of motion. Moreover, multiple passenger units are movably spaced from a central hub for creating distinct forces related to both a rotational speed of the motion based system and the position of passenger units from a central hub.

BACKGROUND

Apparatuses and systems designed to create G-forces, rotational forces, centripetal forces, etc., are represented in the patent literature. Such systems are used to subject individuals to various forces for entertainment and/or training purposes. Training purposes include testing a pilot's capacity to endure certain forces which will be experienced during actual aerial maneuvers. However, the previous apparatuses and systems suffer from several drawbacks as set forth below.

U.S. Pat. No. 4,710,128 ("the '128 patent") to Wachsmuth et al., discloses a flight simulator gimbaled about three axes, namely pitch, roll and yaw. The simulator describes a single cockpit, in the form of a pod, attached to an extended arm and rotated about a centrally located planetary drive assembly. A remote computer and an on-board computer independently, or in communication, control the rotation of the cockpit about the three axes. Other than its ability to produce only limited centripetal forces, the disclosed simulator includes only one cockpit requiring various rotational speeds to produce varying magnitudes of forces. Therefore, the motor is required to endure a heavy workload. Moreover, the device must be routinely stopped to unload and load new subjects.

U.S. Pat. No. 6,042,382 ("the '382 patent") to Halfhill discloses a multi-pod apparatus capable of creating sustained centripetal forces. The entertainment device of the '382 patent only involves two dimensions of motion. As with the '128 patent, the Halfhill device provides limited centripetal forces and requires various rotational speeds to create varying magnitudes of forces. Similarly, the apparatus must be stopped to unload and load new passengers.

The present invention overcomes the deficiencies of the prior art by providing a system having multiple passenger units that may be unloaded and loaded while the system remains in motion. Moreover, radial adjustability of the passenger units, and its one or more passengers, provides means for subjecting passengers to varying forces related to the unit's distance from a central hub location while the system maintains a constant rotational speed. It is also possible to create large sustainable G-forces.

SUMMARY

While objects of the present invention are numerous, several are listed herein for reference.

An object of the present invention is to provide a training and/or entertainment system, having multiple passenger units, for subjecting passengers to sustainable G-forces and related forces.

Another object of the present invention is to provide a system capable of being loaded and unloaded with subjects while the system remains in motion such that a majority of the passenger units experience continued forces while one or more units are being unloaded and loaded.

Another object of the present invention is to provide a system, having multiple passenger units, wherein distinct units may experience different forces while the system maintains a constant rotational speed.

Yet another object of the present invention is to provide a system having a modular design thereby reducing costs and simplifying repairs.

Other objects of the invention will become evident based on the description and claims following herein. An embodiment of the present invention accomplishes its desired objects by movably attaching multiple passenger units to one or more radially extending arms of a motor driven hub. Each passenger unit is gimbaled on three independently-controlled axes, namely pitch, roll and yaw. Each gimbaled unit is movable such that the units may be re-positioned at any time, including during system operation.

The re-positioning of the units provides means for the units to be advanced to a central hub of the rotational system. Once a passenger unit is advanced to the central hub, it is disengaged, by means of a clutch system, from the rotational system. While the rotational system continues to operate, the disengaged unit can be unloaded and loaded without affecting the other operating passenger units. In this manner, the rotational apparatus does not have to be stopped to allow new subjects to be loaded and unloaded. In addition, the units can be repositioned during operation thereby changing the forces "on the fly."

A continuous system saves energy and decreases motor wear by eliminating the need to repeatedly accelerate the system from an idle position. Another advantage of the continuous motion is that the bulk of the momentum is constant resulting in overall increased system efficiency. The continuous system facilitates at least two key advancements. First, for the entertainment and amusement industries it facilitates increased passenger load and therefore increased revenue. Second, in the aviation and military industries it facilitates the ability to change pilots for one simulated flight, such as a short duration flight, while allowing other pilots to continue longer simulated flights without interruption.

In one embodiment radial support arms are formed of multiple segments each capable of supporting one or more passenger units. The segmented arm then rotates about a longitudinal axis of the arm so that a selected segment is aligned properly for loading and unloading. This embodiment provides for a maximum number of passenger units.

As referenced above, another benefit to the design of the present invention is that the passenger units, and therefore passengers, can be subjected to different forces even though the rotational system operates at a constant rotational speed. Centripetal force is a function of mass (m), velocity (v) and the radius (r) of a curved path being traversed as determined by the equation Centripetal Force=$mv^2/r$. Therefore, even though the rotational speed of the apparatus remains constant, the centripetal force can be changed by varying the value of the radius. According to the formula, a passenger attached to a radially extending arm unit 20 feet from a center-point (i.e., r=20 feet) is subjected to a greater centripetal force, assuming an equal velocity, than a second passenger unit attached to the same arm 10 feet (i.e., r=10 feet) from a center-point. Although the centripetal force is inversely related to the radius, it is more influenced by its relation to the square of the velocity. Both units travel a full circle of 360° in the same amount of time so that the passenger unit located at a distance of 20 feet from a center point will travel much farther, and therefore faster, than the passenger unit located at 10 feet from a center point. Therefore, by varying the position of the passenger units, the centripetal forces can be varied while holding the speed of the rotational system constant.

The constant rotational system again facilitates at least two key advancements. First, in the entertainment and amusement industries each passenger unit is able to simulate a different experience such that passengers may choose between simulations. Therefore, a single motion-based system can simulate an entire amusement park of rides. Second, in the aviation and military industries a single motion-based system provides means for multiple pilots to experience varying simulations simultaneously. Such a system can utilize computers to generate simulated flight training or the system may facilitate a real time interface between a physical aircraft and the pilot. For example, the interface may allow a pilot to control one or more Unmanned Arial Vehicles (UAVs). The system allows the pilot to experience the forces associated with actual flight. In other words, the pilot experiences the "seat of the pants" feel associated with the actual piloting an aircraft. Such flight control also allows a pilot to control a missile type weapon. The system also facilitates a scaled experience between a pilot's physical limits and an aircraft's limits thereby providing enhanced feedback related to the aircraft's performance envelope. Thus, a pilot can control an aircraft beyond the pilot's limits but within the structural limits of the aircraft.

A system practicing the present invention may have four arms with one passenger unit attached to each arm. However, it is envisioned that more complex systems may include 8 rotating arms having multiple passenger units per arm. In addition, multiple independent levels may provide even more versatility. In any case, the benefits of the present invention can be realized in any system regardless of its complexity.

The entire system is modular in design such that a current system can be modified quickly and relatively easily to form a more simple or more complex system. Additional arms may be retro-fitted to a simple system or removed from a complex system thereby creating the desired system configuration to address the immediate needs of a system operator. As described below, the passenger units can be attached and removed at the convenience of the system operator. Depending on their weight, a small crane may facilitate the movement of the passenger units.

The system described herein can be controlled by one or more computers in communication with the rotating system and the individual passenger units thereon. In an alternative embodiment, a real time interface is provided between remote sensors on a vehicle being simulated. There is a simple relationship between acquired data (real time or stored) such as roll, pitch and yaw and g-force experienced by a vehicle and the radial position of a corresponding passenger unit. The simple relationship provides quick recording and translation of simulated data and requires no more than four accelerometers, in communication with a recording apparatus, to be attached to a subject vehicle.

In a first embodiment, pitch, roll and yaw measurements, along with speed, acceleration and G-forces, based on true flight data are inputted and stored in computer memory means. The data is then used by the computer to simulate the true conditions in one or more of the passenger units. In this embodiment, the system may be used to test pilots for their capacity to endure flight conditions and specific G-forces associated therewith. In another aspect of the present invention, motion data can be developed independent of true flights and simulated by the system. Such developed data is useful for creating severe flight conditions that may cause an actual aircraft to fail. Therefore, by way of example, pilots can be safely tested for ejection procedures under simulated conditions which, in practice, would cause aircraft failure.

In another embodiment, the system is used for entertainment purposes. For example, actual data, namely speed, acceleration, direction and G-forces, from an actual roller coaster can be inputted and stored by the one or more computers to provide passengers with a realistic thrill-ride experience. The entertainment possibilities are only limited by passengers' threshold for enduring the various applied forces. The present invention allows different passenger units to experience different roller coaster re-creations or simulations during a single operation of the system.

Both the training and entertainment embodiments are rendered more practical and efficient by the modular design, multiple passenger units, ability to load and unload passenger units during operation, constant rotational speed of the system and means for creating various simulations under the same operational conditions.

All embodiments of the present invention replicate G-forces far more accurately than the industry standard for motion base platforms as set by the Walt Disney Corporation. Such is true for military and entertainment applications. This standard is based upon the human body's ability to sense changes in acceleration. Thus, a person inside a motion base system pursuant to the embodiments of the present invention is unable to feel any difference between the simulator and a live event being simulated. In other words, the live event, including every nuance, may be simulated.

BRIEF DESCRIPTION OF THE DRAWINGS

FIG. 3A is a top view of an alternative embodiment of the present invention illustrating several passenger units advanced to a central hub for loading and unloading;

FIG. 4 is a side view of one embodiment of the present invention having a passenger unit on a top and bottom of each arm;

FIG. 5 is a side view of one embodiment of the present invention supporting 32 total passenger units;

FIG. 5A is a side view of an alternative embodiment of the present invention supporting 32 total passenger units;

FIG. 6 is a perspective view of an alternative embodiment of the present invention;

FIG. 7 is an exploded view of the alternative embodiment shown in FIG. 6;

FIG. 8 is a side view of a system accessible from below;

DETAILED DESCRIPTION

Figure 1:
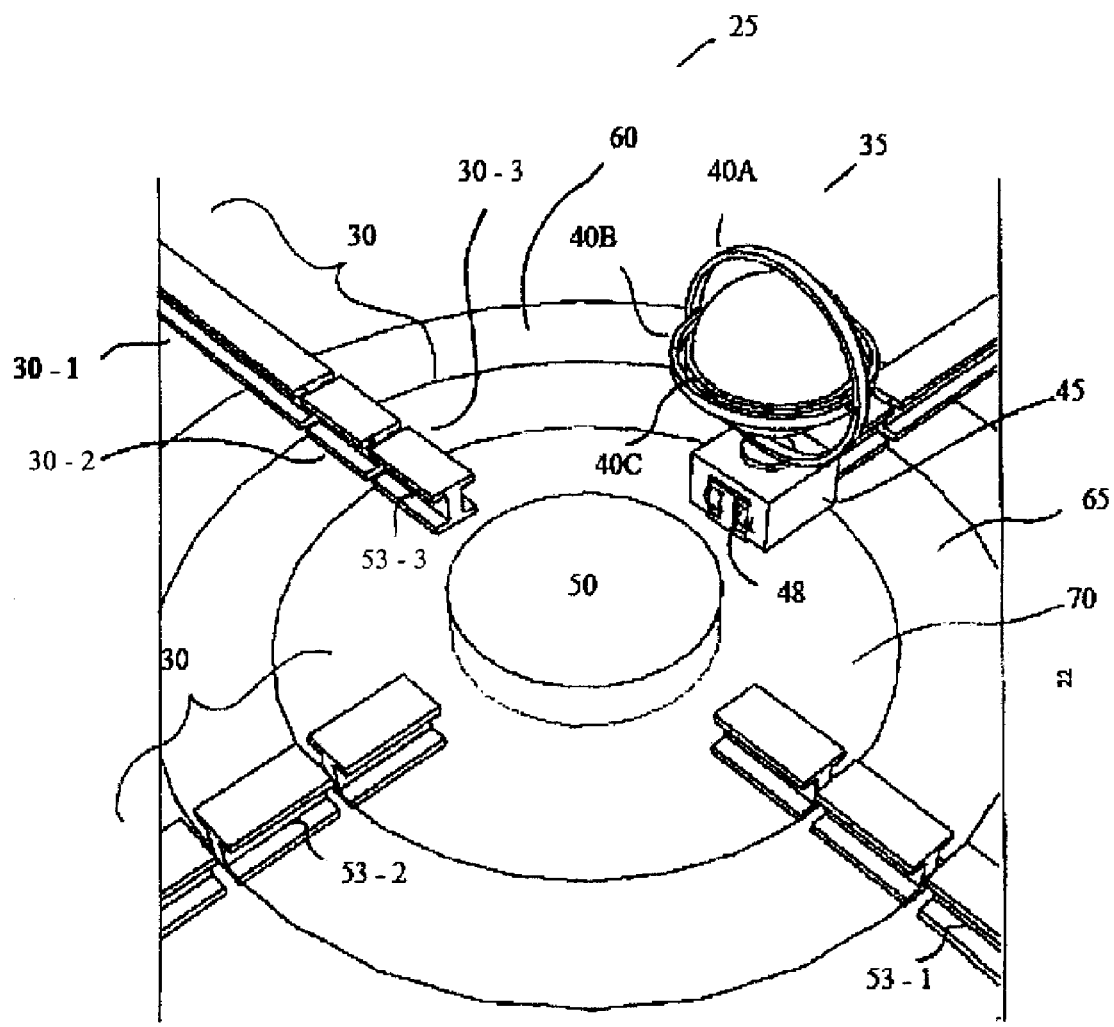
FIG. 1 is a first perspective view of one embodiment of the present invention having four arms each for supporting one or more passenger units.
Figure 2:
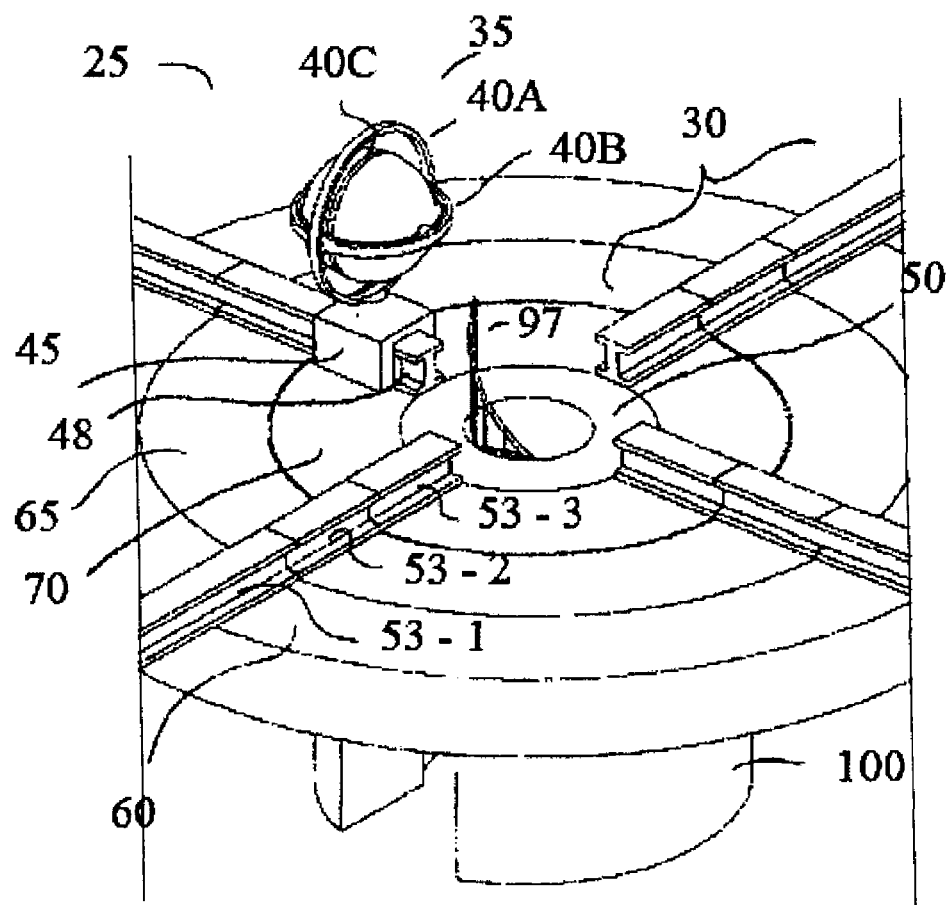
FIG. 2 is a second perspective view of one embodiment of the present invention having four arms each for supporting one or more passenger units.

As shown in FIGS. 1 and 2, a four armed system is generally designated with the numeral 25. The system 25 includes four arms 30 each for supporting one or more spherical passenger units 35. A passenger area of each passenger unit 35 contains passenger seats and other features, including video monitors and related items. It should be understood that the passenger units 35 can take various shapes and sizes without departing from the spirit and scope of the present invention. Each passenger unit 35 is gimbaled about three axes by three independent control frames 40a, 40b and 40c. In turn, the control frames 40a, 40b and 40c are in communication with, and respond to commands from, one or more system computers. One or more system motors or drive mechanisms (not shown) drive the arms 30 and related support devices as required.

While FIGS. 1 and 2 show four arms 30, it should be understood that more or less than four arms are possible. For example, six arms may be used as long as the passenger units 35 are spaced accordingly. Also, with the use of a counter balance, the use of a single arm is possible. As illustrated in FIGS. 1 and 2, each arm 30 comprises three sections 30-1 through 30-3. Depending on the design, the arms 30 may comprise more or less than three sections. Arm sections 30-1, 30-2 and 30-3 are supported by an outer ring 60, clutch ring 65 and inner ring 70, respectively.

In FIGS. 1 and 2, the passenger units 35 are movably attached to the arms 30 by means of carriages 45 which engage and traverse along said arms 30. Wheels 48 within said carriages 45 engage arm channels 53-1 through 53-3. The carriages 45 include motors (not shown) which provide the ability to traverse along said arms 30 as needed. Alternative means for controlling the carriages 45 are also conceivable. An integrated locking mechanism permits the passenger units 35 to be secured at any position along the length of the arms 30. One alternative embodiment comprises passenger units 35 supported by a wheeled base which traverses within a system of tracks (shown in FIGS. 6 & 7).

Figure 3:
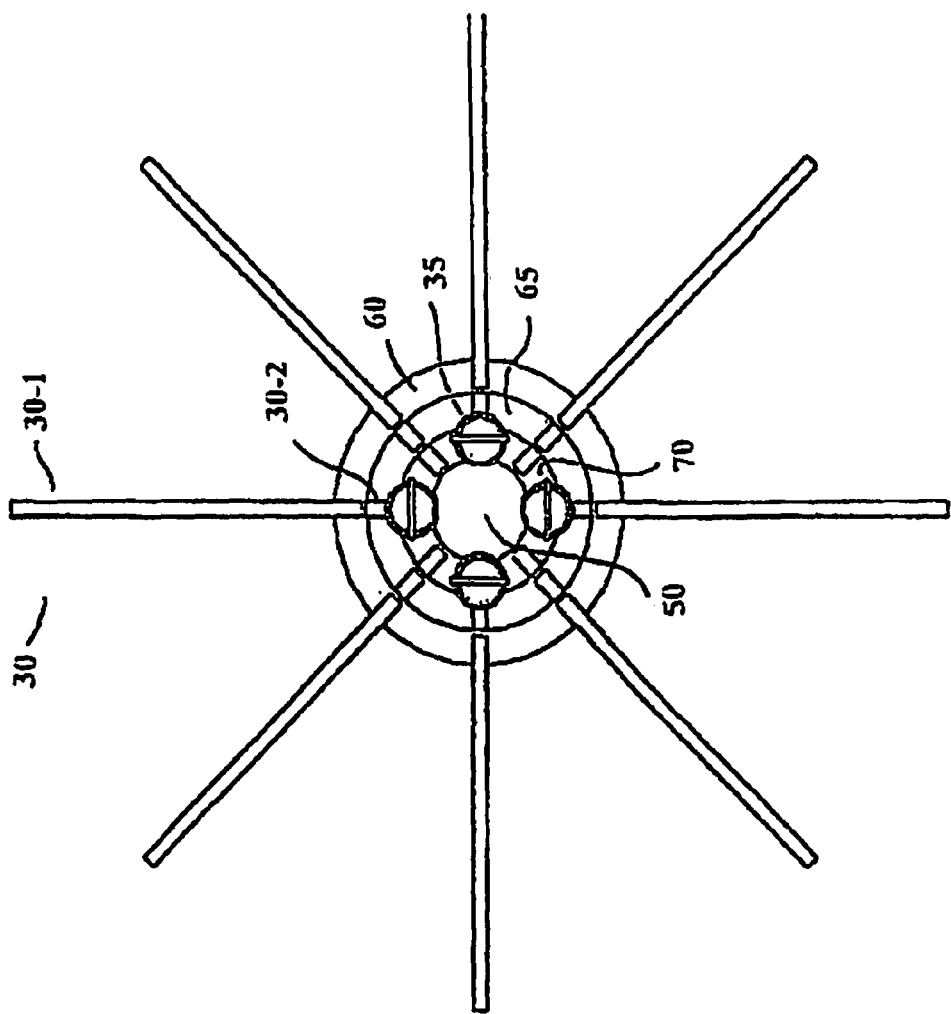
FIG. 3 is a top view of one embodiment of the present invention illustrating several passenger units advanced to a central hub for loading and unloading.

FIG. 3 shows an eight arm system having several passenger units 35 advanced to a central hub 50 for loading and unloading. As shown, a total of eight passenger units 35 may be positioned at the central hub 50. While each arm 30 may support one passenger unit 35, it is also possible that some arms 30 may support more than one passenger unit 35 at a time. The clutch system allows multiple passenger units 35 supported by a single arm 30 to be advanced to the central hub 50. FIG. 3A shows an alternative embodiment wherein each arm 30 may support two or more passenger units 35 which may each be advanced to the central hub 50 using the extra arm sections 30-2 and 30-3. FIG. 4 shows a side view of a system 25 wherein passenger units 35 are positioned on a top and bottom of an arm 30.

Ideally, the loading and unloading of the passenger units 35 is accomplished while components of the system 25 continue to operate. That is, specific passenger units 35 may be advanced to the central hub 50, unloaded, loaded and re-positioned along a specific arm 30 while components, namely the outer ring 60 and clutch ring 65, of the system 25 remain in motion. This eliminates the requirement to stop the system and re-start the system each time passengers need to be loaded and/or unloaded.

In a first embodiment, an outer ring 60 is driven at a constant rotational speed. A clutch ring 65, positioned between the outer ring 60 and inner stationary ring 70, provides a means for loading and unloading passengers during constant rotation of the outer ring 60. The clutch ring 65 is controlled independently of the outer ring 60 such that, during loading and unloading, the clutch ring 60 is accelerated to generally match the rotational speed of the outer ring 60. The passenger unit 35 is then traversed along its supporting arm section 30-1 to a position adjacent to the clutch ring 65. The clutch ring 65 is then accelerated or decelerated until arm section 30-2 aligns with one of the arm sections 30-1 supporting the passenger unit 35 to be advanced to the central hub 50. Once arm section 30-2 is aligned with the arm section 30-1, the guide carriage 45 is free to traverse to arm section 30-2. Then, the clutch ring 65 is slowed to a stop such that arm section 30-2 is aligned with a stationary arm section 30-3 supported by the inner ring 70. Thereafter, the guide carriage 45 traverses onto arm section 30-3 so that passengers may be unloaded and new passengers may be loaded while the outer ring 60 and clutch ring 65 continue to rotate. In this manner, the outer ring 60 is constantly in motion. Thus, there is no down time associated with the system 25.

Once new passengers are loaded, the carriage 45 is traversed to the arm section 30-2 supported by said clutch ring 65. The clutch ring 65 is again accelerated to a rotational speed generally matching that of the outer ring 60 until the arm section 30-2 is aligned with arm section 30-1. The carriage 45 then traverses from the clutch ring 60 to a predetermined position along arm section 30-1. A system of sensors (not shown) or the like facilitate the alignment of the arm sections 30-1 through 30-3.

FIG. 5 illustrates a clutch system utilizing eight arms 30 and thirty-two passenger units 35. FIG. 5A shows a non-clutch system with passenger units 35 attached to the top and bottom of the arms 30. Ideally, with a multi-level system, adjacent levels rotate in opposite directions to eliminate (even number of levels) or reduce (odd number of levels) the torque created relative to the support base by the rotating masses.

FIGS. 6 and 7 show an alternative embodiment, comprising a plurality of tracks 75-1 through 75-3 integrated in a series of planar platforms 85-95. The tracks 75-1 through 75-3 restrain a wheeled base unit 88 supporting each passenger unit 35. In the track embodiment, there is an outer platform 85, clutch platform 90 and inner stationary platform 95. Loading and unloading is accomplished as set forth above. That is, the clutch platform 90 is accelerated to generally match the speed of the outer platform 85 such that a passenger unit 35 may traverse from the outer platform 85 to the clutch platform 90. Then, once the track 75-2 in the clutch platform 90 aligns with a track 75-3 in the stationary platform 95, the clutch platform 90 decelerates and stops.

While both the arm embodiment and track embodiment refer to a clutch system, each system may operate with continuous arms and continuous tracks integrated within a single planar platform. In other words, the passenger units 35 may be unloaded and loaded in a traditional fashion by advancing them to the central hub 50 and stopping the system 25. Then, when loaded the passenger units 35 may be advanced along the arm accordingly.

The positioning of the units 35 and the speed of the outer ring 60, clutch ring 65, outer platform 85 and clutch platform 90 are preferably controlled by computers comprising both hardware and software. Ideally, the motor driven outer ring 60, clutch ring 65, outer plate 85 and clutch plate 90 communicate with, and respond to commands from, one or more computers. Sensors may be used to facilitate alignment of the arm sections 30-1 through 30-2 and tracks 75-1 through 75-3 during loading and unloading of the passenger units 35.

While shown with one passenger unit 35 per arm 30, multiple passenger units 35 may be spaced along a single arm 30 such that an inner most passenger unit is able to traverse to the clutch ring 65 for loading and unloading. Any outer passenger units 35 may then be re-positioned during activation. For a clutch based system, arms 30 may support two units 35. In such an arrangement (as shown in FIG. 4), there is one unit 35-1 on top of the arm 30 and one unit 35-2 on the bottom of the arm 30. However, as shown in FIGS. 3 and 3a, providing additional arm sections 30-3 or tracks 75-3 on the inner ring 70 and inner platform 85 make it is possible to traverse multiple passenger units 35 from a single arm 30 or track 75 to the central hub 50 for loading and unloading.

Two situations compel moving the passenger units 35 along the arms 30. First, moving the passenger units 35 radially outward and inward along arms 30 alters the forces acting upon the passenger units 35 and corresponding passengers during operation of the system 25. Second, moving a passenger unit 35 to the clutch ring 65 provides a means, as described above, for unloading and loading passengers during operation of the system 25.

As shown in FIGS. 2, 5, 5A and 8, in one embodiment passengers access the loading and unloading central hub 50 by ascending stairs 97 or riding an elevator integrated within a central tower 100 around which the system 25 operates. Alternatively, as shown in FIG. 8, a walkway 105 provided above the system 25 allows passengers to descend stairs 97 or ride an elevator to the central hub 50. Once passengers reach the central hub 50, they enter and are secured into one of the passenger units 35. Thereafter, the passenger unit 35 is traversed to arm section 30-2 supported by the clutch ring 65. The clutch ring 65 is then accelerated to generally match the speed of the outer ring 60 so that the arm section 30-2 aligns with the desired arm section 30-1 supported by said outer ring 60. The passenger unit 35 is then traversed and positioned along the length of the arm section 30-1 accordingly. Alternatively, the passenger unit 35 is traversed to track 75-2 supported by clutch platform 90 and then track 75-3 where it is positioned accordingly.

Operation of the system 25 is controlled by one or more computers in communication with a first motor which drives the outer ring 60. The first motor may be positioned beneath the inner stationary ring 70. A second motor located between the clutch ring 65 and outer ring 60 is used to drive the clutch ring 65. This allows for independent control of the clutch ring 65 allowing it to stop and properly align with the inner ring 70 thereby allowing the second motor to act as a generator. Accelerating the clutch ring 65 to match the speed of the outer ring 60 requires stoppage of the second motor but does not require additional electricity. Alternatively, the clutch ring 65 is driven by a separate second motor positioned beneath the inner stationary ring 70. Preferably, the rotational speed of the outer ring 60 is held constant. A constant rotational speed implies that the forces on the passenger units 35 be dictated by changing moment arm measured from the central hub 50 to the specific passenger unit 35. It is well understood that the centripetal forces experienced by a mass increase as the length of the moment arm increases and the rotational speed is held constant. By placing multiple passenger units 35 at varying distances from the central hub 50 the forces experienced by each unit 35 will be different even though the rotational speed of the outer ring 60 remains constant. In other words, a passenger seated in a unit 35 very near the central hub 50 will be acted on by much less centripetal force than a passenger in a unit 35 placed a greater distance from the central hub 50. The same computer arrangement controls the track embodiment as well.

Figure 9:
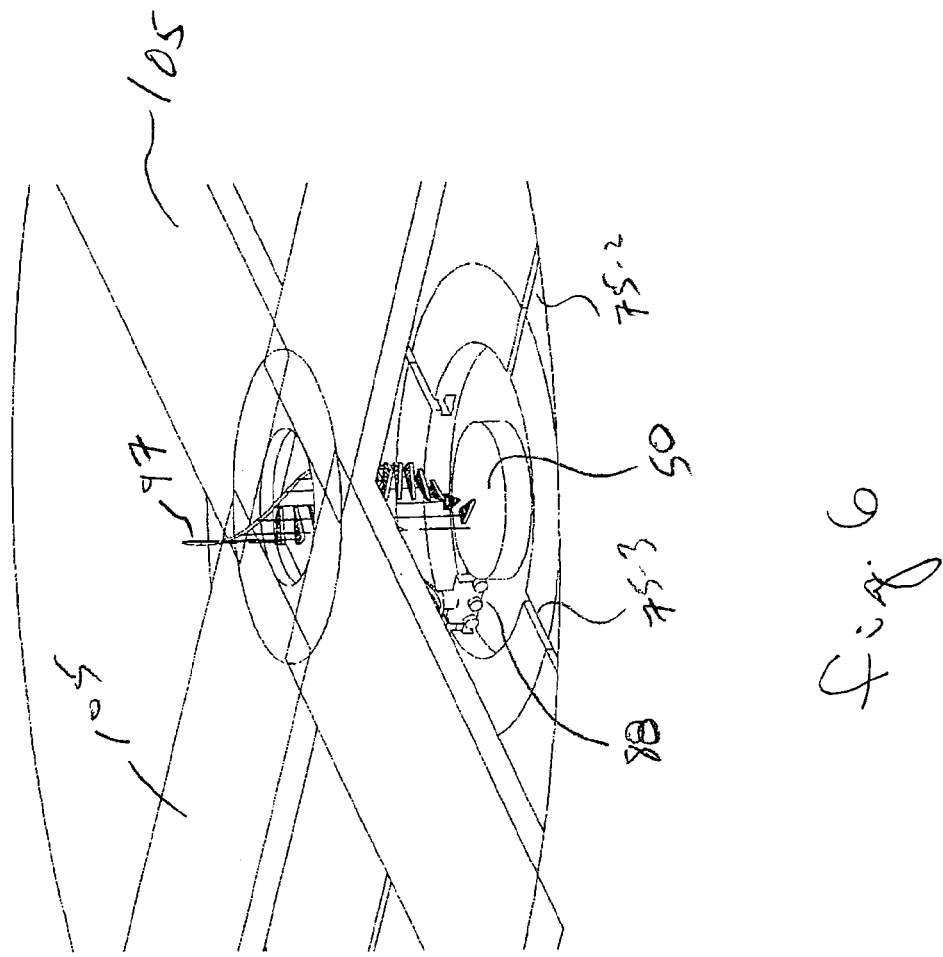
FIG. 9 is a top view of another alternative embodiment of the present invention.
Figure 9:
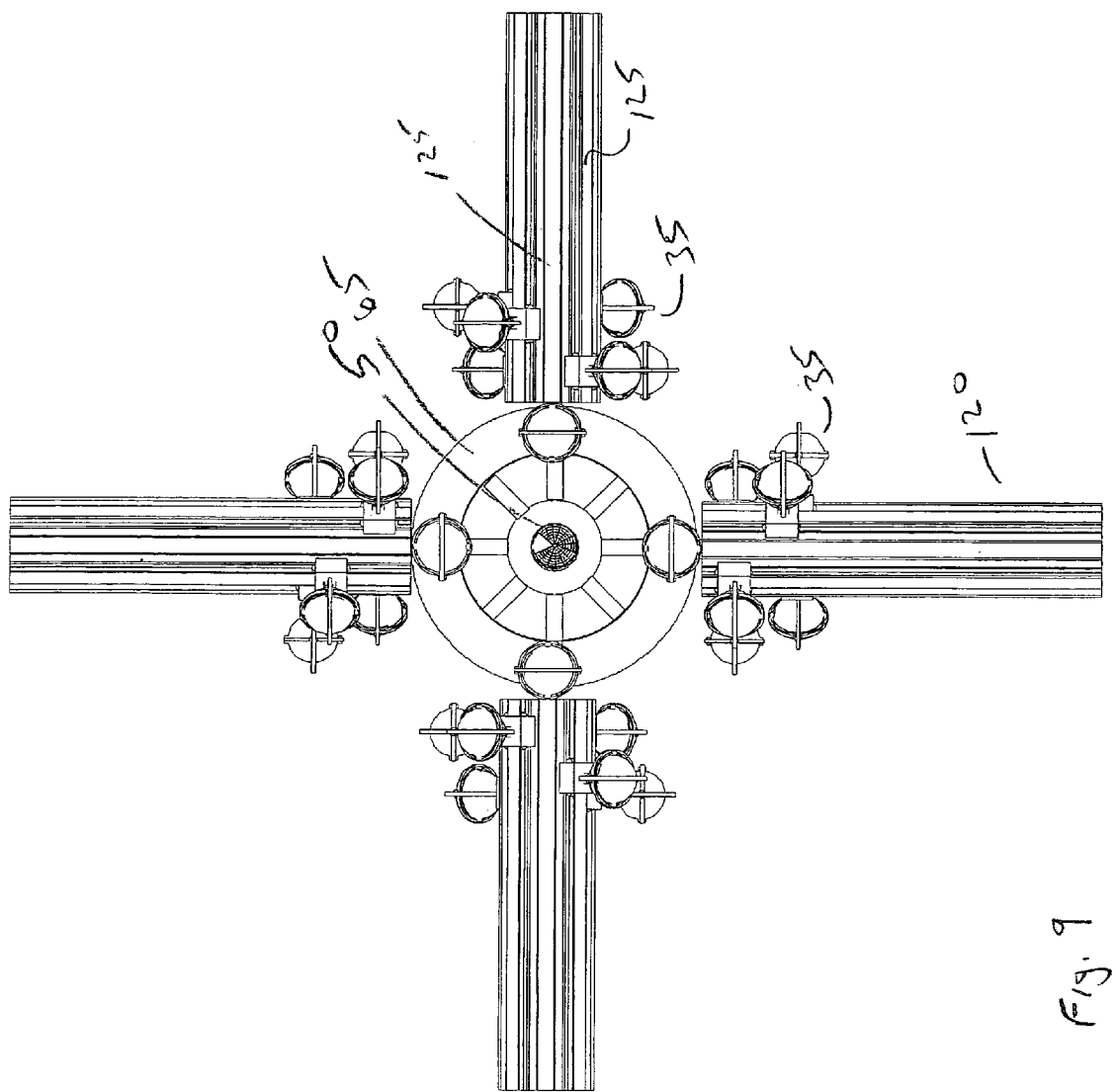
Figure 10:
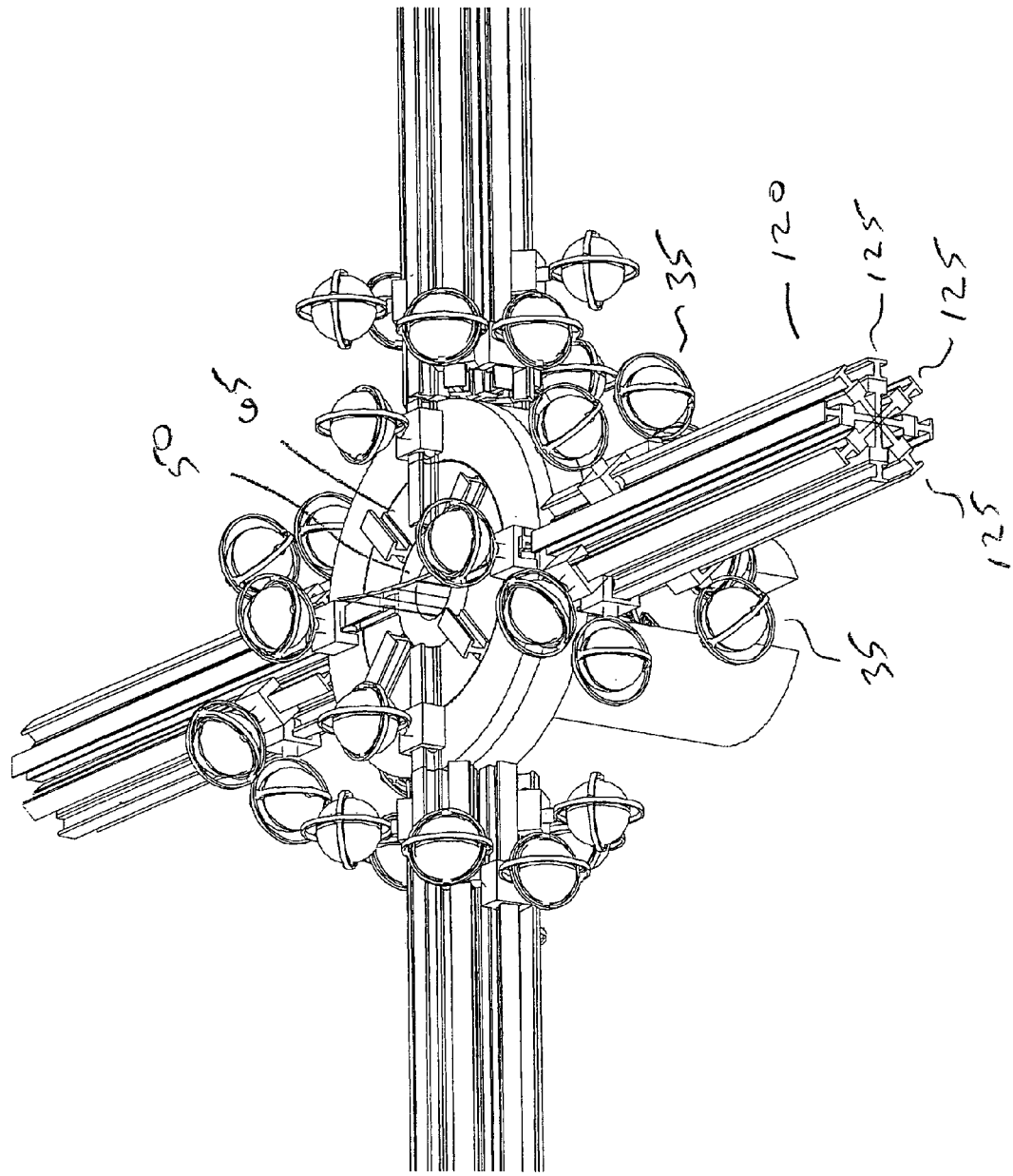
FIG. 10 is a perspective top view of the alternative embodiment shown in FIG. 9.

FIG. 9 is a top view of another embodiment wherein each arm 120 comprises a plurality of segments 125, each designed to support one or more passenger units 35. In this embodiment, each arm 120 is capable of rotating along its length so that each arm 120 supports more passenger units 35 than the previous embodiments. In this manner each arm 120 may be rotated to align a selected segment 125 with a clutch ring 65 thereby allowing a selected passenger unit 35 to advance to the central hub 50. In FIG. 9 the segments 125 each have an I-beam cross-section permitting the passenger units 35 to connect thereto. It is also contemplated that the segments 125 may have different cross-sections. FIG. 10 illustrates a perspective top view of the segmented embodiment.

Figure 11:
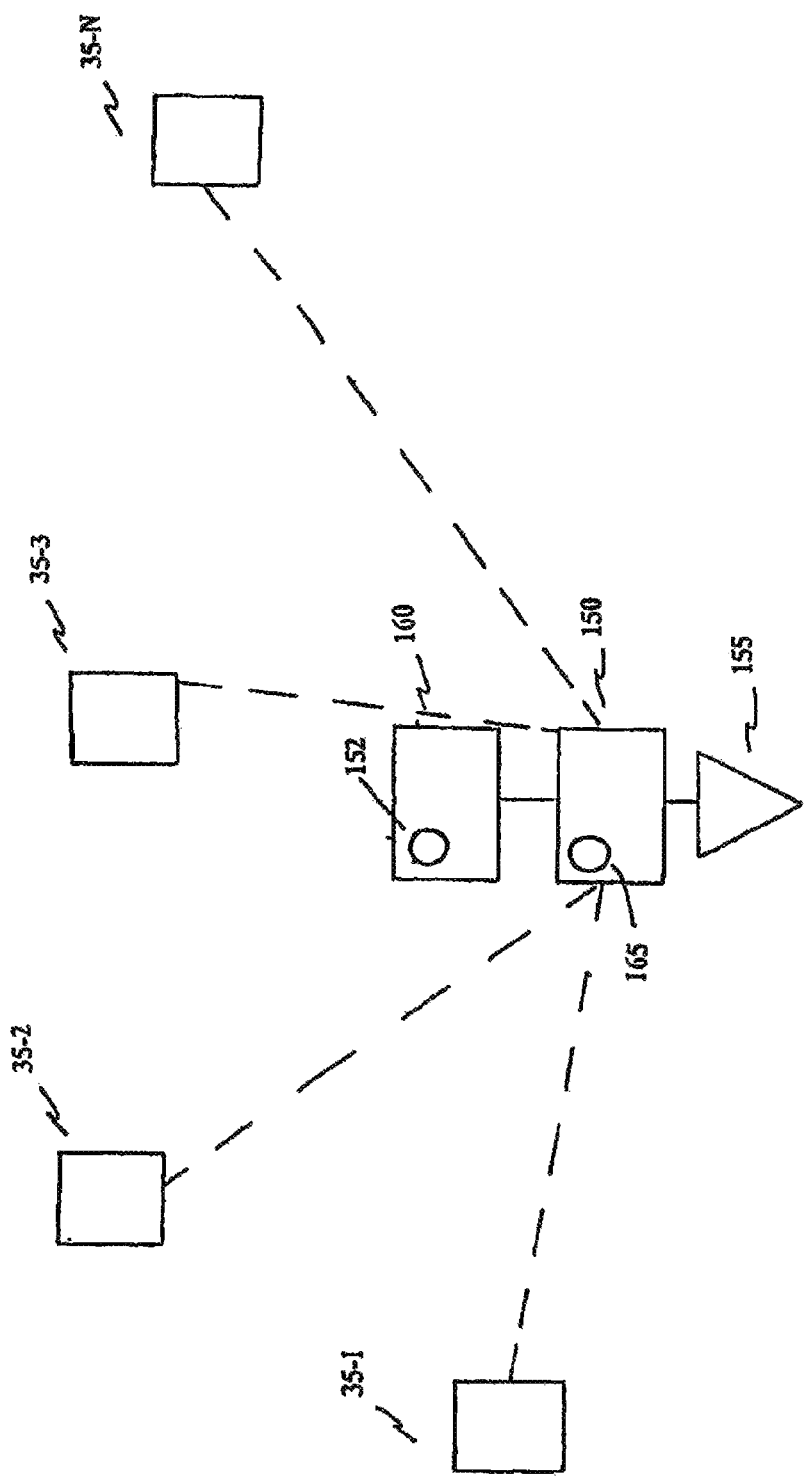
FIG. 11 is a block diagram of a central computer system in communication with a rotating device having individual passenger units.

FIG. 11 illustrates a block diagram detailing a first embodiment of a communication link between the system 25 and a central computer 150. Initially, data 152 is inputted through input means 155 and stored in memory means 160 of the computer 150. The input means 155 can be a keyboard, CD-ROM drive, floppy disk drive, network download, online connection, etc. Further, the memory means 160 can be selected from a myriad of memory devices, including CD-ROM drives, hard drives, magnetic tape, etc. The stored data 152 can be true data or simulated data as described above. Recording true simulation data is very simple since it only involves a direct translation of actual recorded forces. Moreover, more than one true or simulated scenario may be inputted such that different passenger units 35-1 through 35-N are acted upon differently under the same operational conditions (i.e., system rotational speed).

A microprocessor 165 of the central computer 150 processes the inputted data 152 and determines the parameters necessary to re-create the forces corresponding to the data 152. As indicated previously, individual passenger units 35-1 through 35-N experience different forces by varying their moment arm. The central computer 150 determines the required moment arms corresponding to the inputted data 152 and accordingly positions the passenger units 35 radially along the arms 30. Thereafter, the central computer 150 controls the movement of the passenger units 35 about their gimbaled axes such that each passenger unit 35-1 through 35-N experiences the forces corresponding to the inputted and stored data 152 associated with the one or more scenarios. The central computer also controls the loading and unloading of the passenger units 35. In other words, the computer 150 ensures the arm sections 30-1 through 30-3 and tracks 75-1 through 75-3 of each arm 35-1 through 35-N are aligned for traversing the passenger units 35-1 through 35-N to and from the central hub 50. Thus, the computer 150 is in communication with the alignment sensors or similar devices used for aligning the arm sections 30-1 through 30-3 or tracks 75-1 through 75-3. The communications between the central computer 150 and the passenger units 35-1 through 35-N and sensors may be via hard wiring or wireless technology.

Figure 12:
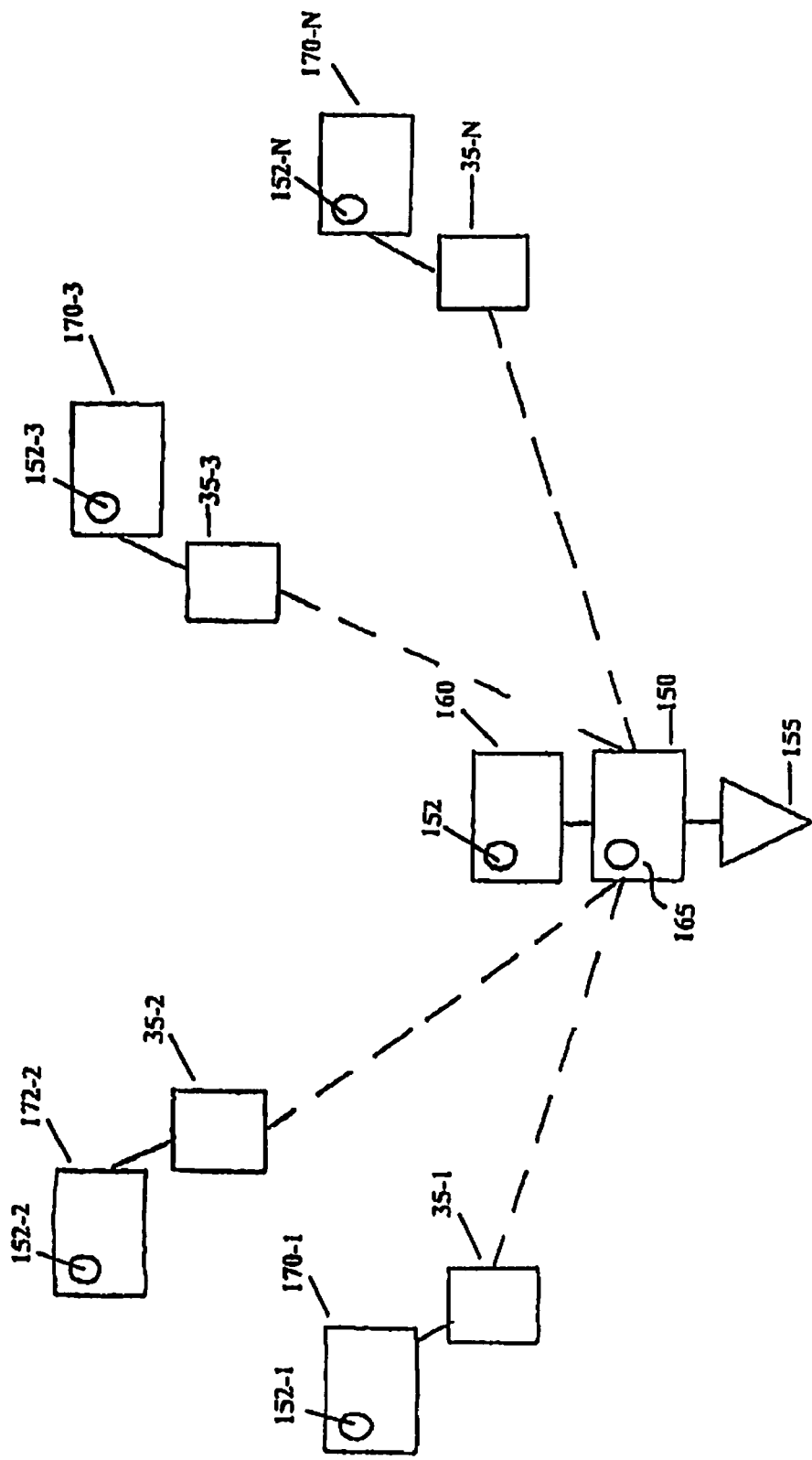
FIG. 12 is a block diagram of a central computer in communication with the rotating apparatus and local computers assigned to one or more passenger units.

FIG. 12 illustrates an alternative embodiment utilizing the central computer 150 linked to local computers 170-1 through 170-N corresponding to each passenger unit 35. In this embodiment, the local computers 170-1 through 170-N each include their own memory means 175-1 through 175-N and may include individual input means. Ideally, data 152 is still inputted to the central computer 150 which determines the parameters necessary to re-create the forces corresponding to the data 152. Thereafter, the parameters or data 152-1 through 152-N are communicated to the local computers 170-1 through 170-N as required. Once the parameters are communicated to the local computers 170-1 through 170-N, the local computers 170-1 through 170-N are available to control the movement of the passenger units 35-1 through 35-N about their gimbaled axes such that each passenger unit 35-1 through 35-N experiences the forces corresponding to the inputted and stored data 152-1 through 152-N associated with the one or more scenarios. The communication between the central computer 150 and the local computers 170-1 through 170-N can be implemented through physical lines or wireless technology.

The central computer 150 continues to instruct the motors with respect to driving the outer ring 60 or outer platform 90 at a constant rotational speed. This alternative networked embodiment removes a portion of the work required of the central computer 150 and transfers the work to the local computers 170-1 through 170-*n*. For example, the local computers 170-1 through 170-*n* now control the movement of the passenger units 35 such that the central computer 150 acts more as an input and calculation device.

To enhance the experience, other features may be implemented. For example, each passenger unit 35 may include a projection system. The projection system maybe a simple flat panel display mounted therein or a 360° curved display. In any arrangement, the projection system is designed to project an environment to the passengers. The projected environment may be live or simulated. For example, if the system 25 causes a subject passenger unit 35 to experience a roller coaster ride, the projected environment may be stored footage obtained from a front seat of the actual roller coaster. Another enhancement feature comprises a sound system for further providing a simulated or realistic environment corresponding to the forces applied to the subject passenger unit 35. Inputs for the sound system may comprise a microphone located at a live location or stored sound associate with the visually projected environment. Yet another enhancement feature is the ability to controllably alter the temperature and smell inside the passenger units 35 and to create wind and spray water within the passenger units 35. Any number of systems maybe used to create a realistic environment within the passenger units 35.

Optionally, actuators may be attached to the passenger units 35 to optimize the position of the units 35 during large G-force changes or to provide sudden jarring motions.

Although the invention has been described in detail with reference to various embodiments, additional variations and modifications exist within the scope and spirit of the invention as described and defined in the following claims.

I claim:

1. A motion-based apparatus comprising:
   one or more passenger units movably coupled to one or more support arms, said one or more support arms extending radially relative to a central stationary hub;
   one or more clutch units positioned between said one or more support arms and said central stationary hub, said clutch units configured to receive said passenger units from said one or more support arms;
   a motor configured to drive said support arms and clutch units in a generally circular path relative to said central stationary hub; and
   one or more clutch units configured to align with said one or more support arms while said support arms and clutch units are in rotation allowing unloading and loading of one more passengers while other passenger units are in motion.

2. The motion-based apparatus of claim 1 wherein the one or more passenger units are movably coupled to the one or more support arms by means of a carriage member engaging the one or more support arms.

3. The motion-based apparatus of claim 1 wherein the means for driving said support arms and clutch units is one or more motors.

4. A motion-based apparatus comprising:
   one or more passenger compartments movably coupled to one or more support arms, said one or more support arms extending radially relative to a central stationary hub;
   said support arms being attached to an outer rotatable platform member;
   said outer rotatable platform member positioned adjacent to a rotatable clutch member wherein said rotatable clutch member is positioned between said outer rotatable platform member and said central stationary hub;
   a motor configured to rotate said outer rotatable platform member and said rotatable clutch member; and
   one or more transfer units affixed to said rotatable clutch member for facilitating transfer of the one or more passenger compartments between the outer rotatable platform member and said central stationary hub while said support arms continue in motion.

5. The motion-based apparatus of claim 4 wherein said outer rotatable platform member and said rotatable clutch are circular in shape.

6. The motion-based apparatus of claim 4 wherein the stationary hub includes one or more stationary units for receiving a carriage member.

7. The motion-based apparatus of claim 4 wherein said support arms have an I-beam or t-slot cross-section.

8. The motion-based apparatus of claim 6 wherein the stationary hub is located within an inner circumference of said rotatable clutch member.

9. The motion-based apparatus of claim 4 wherein the stationary area facilitates loading and unloading of passengers into and out of the passenger compartments.

10. The motion-based apparatus of claim 4 wherein said passenger compartments are gimbaled about three axes.

11. The motion-based apparatus of claim 4 wherein the one or more passenger compartments include a video monitor.

12. The motion-based apparatus of claim 4 wherein the one or more passenger compartments include a sound system.

13. The motion-based apparatus of claim 4 wherein the one or more passenger compartments include means for scenting the compartment.

14. The motion-based apparatus of claim 4 wherein the one or more passenger compartments include means for misting the compartment.

15. A motion-based system comprising:
   one or more passenger units movably supported by passenger unit radial tracks integrated within a passenger unit circular platform, said passenger unit radial tracks extending radially relative to a central stationary hub;
   one or more clutch tracks integrated within a clutch platform positioned between said passenger unit circular platform and said central stationary hub, said one or more clutch tracks configured to receive said passenger units from said one or more passenger unit radial tracks;
   a motor for rotating said passenger unit circular platform and clutch platform relative to said central stationary hub;
   means for moving said passenger units along said radial tracks different distances from said stationary central hub to generate varied forces on said one or more passenger units; and
   one or more clutch tracks configured for alignment with said one or more passenger unit radial tracks while said passenger unit radial tracks and clutch tracks are in rotation allowing unloading and loading of one more passengers while other passenger units are in motion.

16. The motion-based system of claim 15 wherein the one or more passenger compartments are movably supported by a carriage member.

17. A motion-based apparatus comprising:
   one or more passenger compartments supported by a first series of tracks integrated in an outer rotatable planar platform, said first series of tracks extending radially relative to a central stationary hub;

said outer rotatable planar platform positioned adjacent to a rotatable clutch platform having a second series of tracks, said rotatable clutch platform positioned between said outer rotatable planar platform and said central stationary hub; and a motor configured to rotate said outer rotatable planar platform and said rotatable clutch platform relative to said central stationary hub such that one of said series of tracks aligns with one of said first series of tracks to facilitate transfer of passenger compartments from said outer rotatable planar platform to a stationary platform adjacent to said central stationary hub.

18. The motion-based apparatus of claim 17 wherein said one or more passenger compartments are gimbaled about three axes.

19. The motion-based apparatus of claim 17 wherein the one or more passenger compartments include a video monitor.

20. The motion-based apparatus of claim 17 wherein the one or more passenger compartments include a sound system.

21. The motion-based apparatus of claim 17 wherein the one or more passenger compartments include means for scenting the compartment.

22. The motion-based apparatus of claim 17 wherein the one or more passenger compartments include means for misting the compartment.

23. A motion-based apparatus comprising:

one or more passenger units movably coupled to one or more support arms, said support arms each formed of a plurality of segments such that said segments may be rotated about a longitudinal axis of the support arms, said one or more support arms extending radially relative to a central stationary hub;

one or more clutch units positioned between said one or more support arms and said central stationary hub, said clutch units configured to receive said passenger units from said one or more support arms;

a motor configured to drive said support arms and clutch units in a generally circular path relative to said central stationary hub;

means for moving said one or more passenger units along said support arms different distances from said central stationary hub to generate varied forces on said passenger units; and one or more clutch units for alignment with said one or more support arms while said support arms and clutch units are in rotation allowing unloading and loading of one more passengers while other passenger units are in motion.

24. The motion-based apparatus of claim 23 wherein each segment supports one or more passenger units.

25. The motion-based apparatus of claim 23 wherein each segment comprises an I-beam cross-section.

* * * * *